April 12, 1938.  E. H. J. C. GILLETT  2,114,221
POWER CLUTCH OPERATOR FOR MOTOR VEHICLES AND CONTROL MEANS THEREFOR
Filed April 29, 1935  5 Sheets-Sheet 2

Inventor
Edward H. J. C. Gillett
by Wilkinson & Mawhinney
Attorneys.

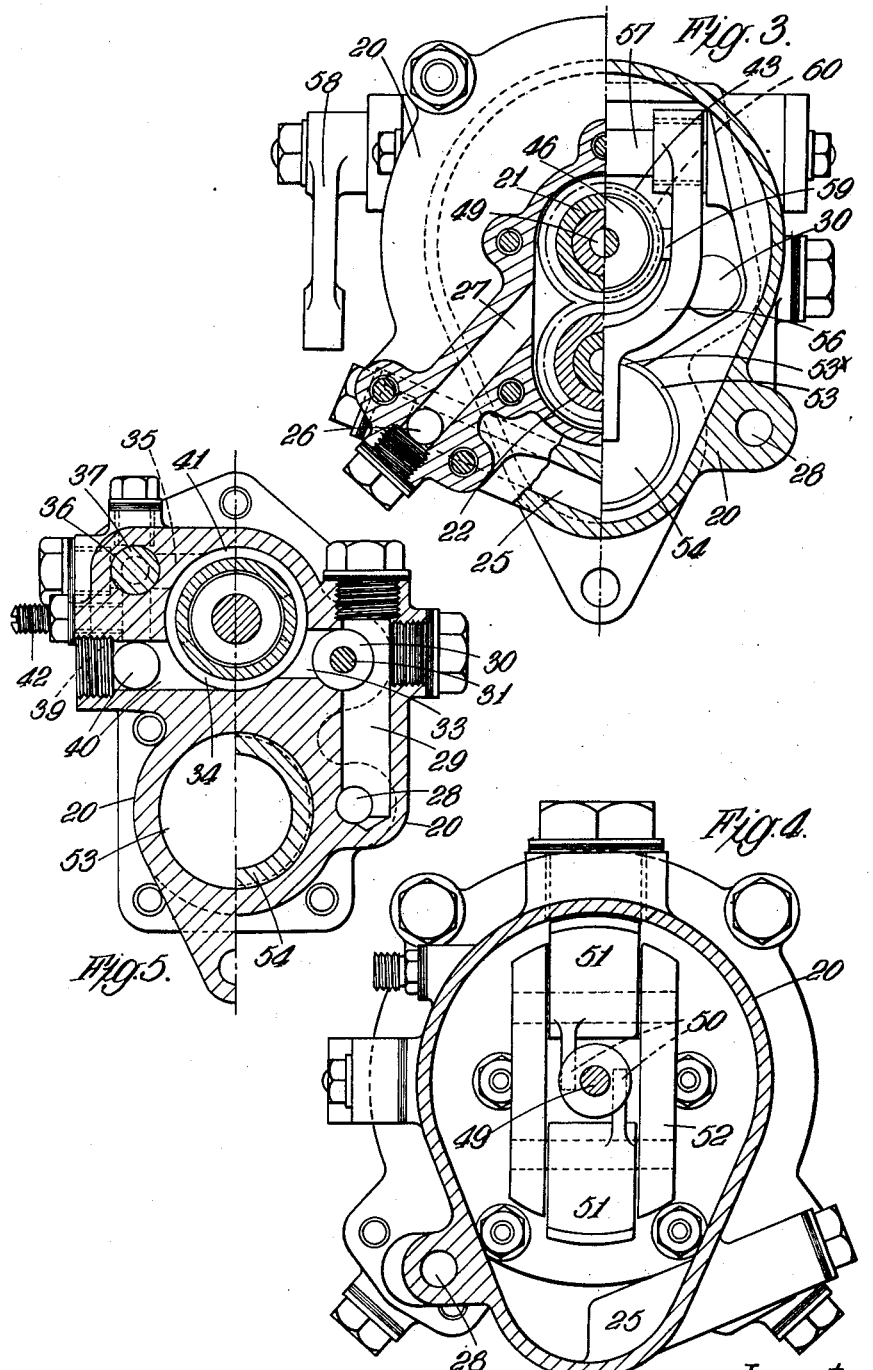

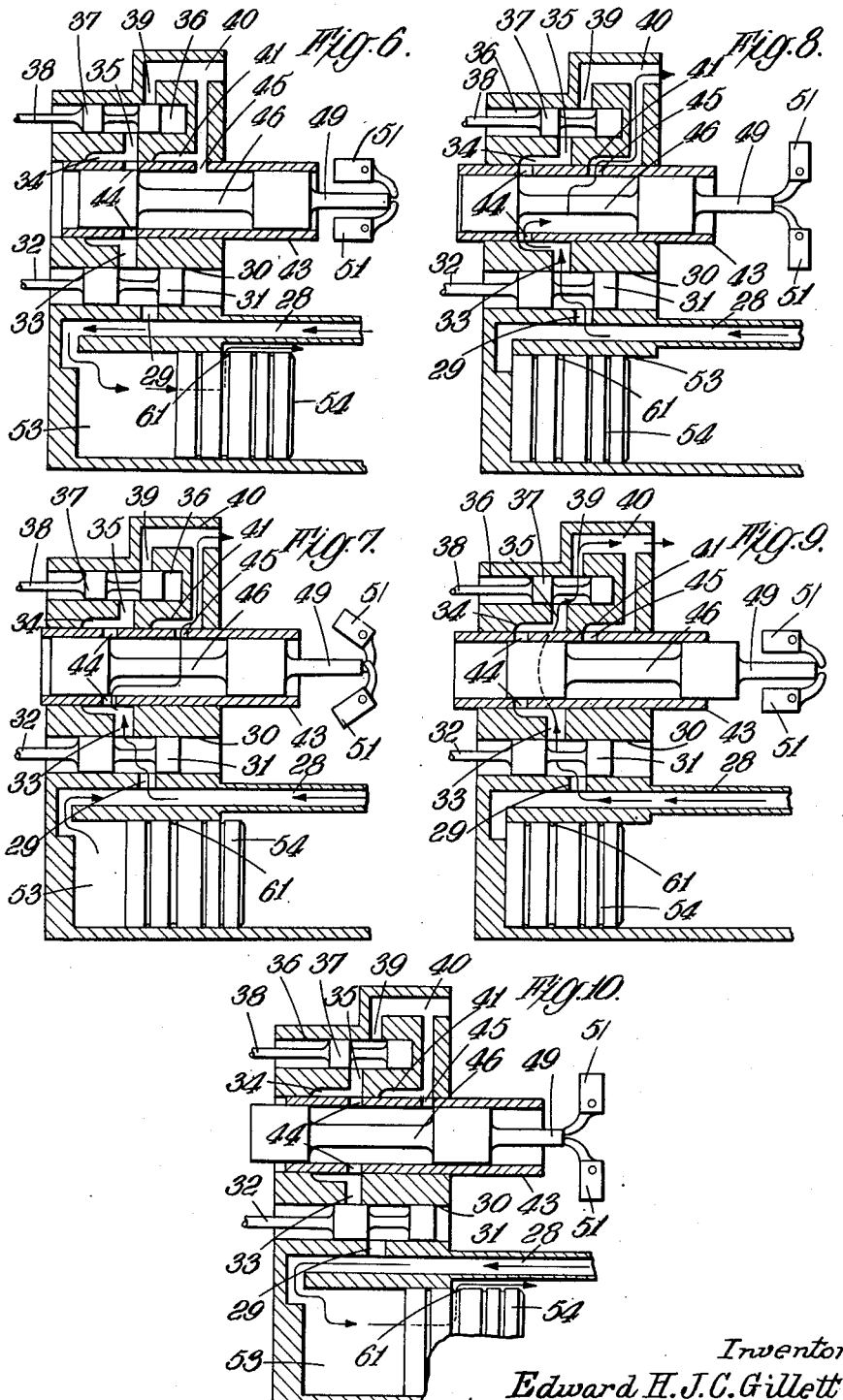

April 12, 1938.　　E. H. J. C. GILLETT　　2,114,221
POWER CLUTCH OPERATOR FOR MOTOR VEHICLES AND CONTROL MEANS THEREFOR
Filed April 29, 1935　　5 Sheets-Sheet 5
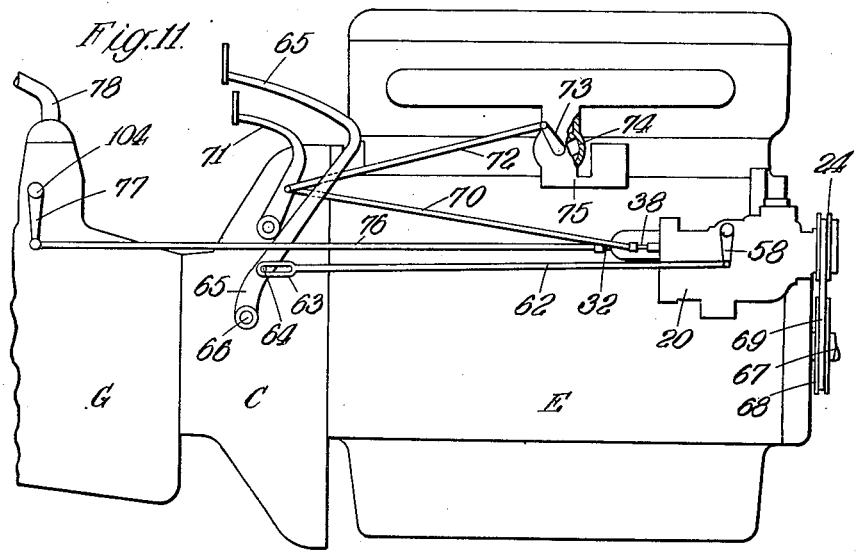
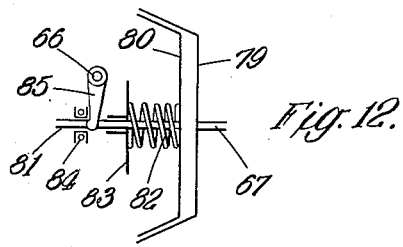
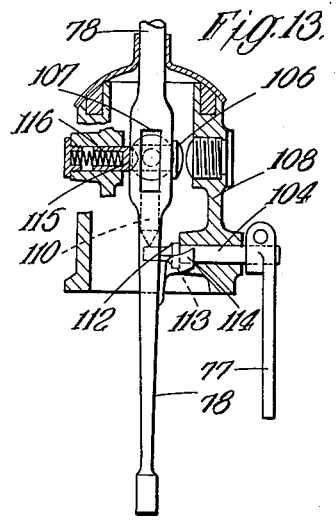
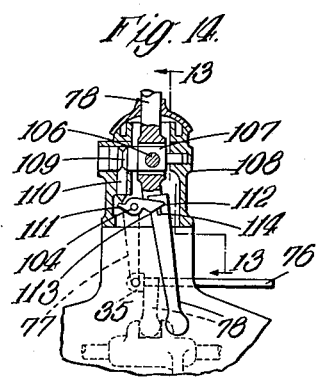
Inventor
Edward H. J. C. Gillett
by Wilkinson & Mawhinney
Attorneys.

Patented Apr. 12, 1938

2,114,221

UNITED STATES PATENT OFFICE 2,114,221

POWER CLUTCH OPERATOR FOR MOTOR VEHICLES AND CONTROL MEANS THEREFOR

Edward Henry James Cecil Gillett, London, England

Application April 29, 1935, Serial No. 18,931
In Great Britain May 4, 1934

11 Claims. (Cl. 192—.01)

The present invention relates to power clutch operators for motor vehicles and control means therefor.

More particularly the invention refers to a power clutch operator having a clutch-operating member connected to the usual withdrawal mechanism of a spring-actuated transmission clutch and which is controllable automatically in accordance with the speed and torque of the engine but is also controllable manually when required.

The main object of the invention is the simplification of the driving of the vehicle. With this object I provide a power clutch operator with automatic control means responsive to the speed of the engine and operating to effect disengagement of the clutch when the engine turns at less than a selected speed. I also provide the power clutch operator with a throttle-connected control which operates to ensure the engagement of the clutch when the throttle opening exceeds a selected value. I further provide an independent control which can be manually operated to effect disengagement of the clutch, more especially for the purpose of gear changing, when the speed of the engine exceeds the selected speed below which the speed responsive control is effective to disengage the clutch.

More especially the speed responsive control is combined with a "follow-up" mechanism comprising a control member which is moved in accordance with the movement of the clutch-operating member in such a way as to check the action of the speed responsive control both in engaging and disengaging the clutch. This action takes place over a predetermined range of engine speeds, the result being that whereas at speeds below the said range the clutch is disengaged and at speeds above the said range it is engaged, for engine speeds within the predetermined range the degree of engagement of the clutch is approximately proportional to the speed, so that the clutch is progressively engaged or disengaged as the engine speed is increased or decreased through the said predetermined speed range.

One result of this is that at a certain speed within the range of operation of the speed responsive control the clutch may be slipped indefinitely and this might entail a risk of damaging the clutch if the torque load transmitted were large as would be the case if the tractive resistance to be overcome were large. Such a situation may arise in attempting to force the vehicle up a steep gradient in a high gear, or in attempting to start with an obstruction in front of the wheels. For this reason the throttle-connected control is provided, which, if the throttle is opened beyond a predetermined point and consequently if the torque delivered by the engine exceeds an approximately predetermined value, overrides the action of the speed responsive control and ensures the complete engagement of the clutch.

The independent control is preferably interconnected with the gear-shift lever in such a way that it operates to disengage the clutch during changes of gear. This control overrides the speed responsive control so that the clutch may be disengaged for gear changing when the engine is turning fast.

One form of clutch operator having control means of this kind is described in the specification of my copending patent application Serial No. 703,473 dated 21st December 1933. In this arrangement the clutch operator utilizes fluid pressure controlled by valve means and both the speed responsive and the independent, e. g. gearshift-lever connected, control means actuate the same valve member, the throttle-connected control means acting on an independent valve member.

In such an arrangement the action of the throttle-connected control in overriding the speed responsive control to ensure clutch engagement at large throttle openings also overrides the gear shift connected control and prevents the latter from disengaging the clutch at the said large throttle openings, with the result that when it is required to disengage the clutch during gear shifting it is necessary to release the accelerator to enable the clutch to disengage.

A particular object of the present invention is to overcome this defect by providing a control arrangement in which the independent control, connected e. g. to the gear shift lever, is effective to disengage the clutch not only when the engine is turning at high speed but also when the throttle opening exceeds the selected value corresponding to the engagement of the clutch by the throttle-connected valve.

The present invention consists in all the features herein described and shown or either severally and all combinations thereof, including such modifications as may be within the competence of those skilled in the art and is not restricted to the structural details of the embodiment hereinafter described with reference to the accompanying drawings, said description being given merely by way of example, nor is it in any way restricted to or by anything described or claimed in my copending patent application Serial No. 703,473, the scope of the present invention being defined in and by the hereto appended claims.

In the drawings:—

Fig. 3 is a view in transverse vertical section taken along the line 3—3 of Fig. 2;

Fig. 4 is a view in transverse vertical section taken along the line 4—4 of Fig. 1;

Fig. 5 is a view in transverse vertical section taken along the line 5—5 of Fig. 2;

Figure 6 shows diagrammatically the essential parts of the clutch operator with the path and direction of the oil flow indicated by arrows, the parts having the positions they occupy when the engine is turning at idling speed and the accelerator is released, the clutch being disengaged.

Figure 7 is a view similar to Figure 6 showing the positions of the parts when the engine speed is within the range of operation of the centrifugal control and the clutch is partially engaged.

Figure 8 is a view similar to Figure 6 showing the positions of the parts when the engine is turning at high speed, the clutch being engaged.

Figure 9 is a view similar to Figure 6 showing the positions of the parts with the engine turning at low speed but with the throttle open, the clutch being engaged.

Figure 10 is a view similar to Figure 6 showing the positions of the parts when the engine is turning at high speed and the clutch is disengaged under the action of the gear lever-connected control.

Fig. 11 is a view in side elevation showing the external connections of the clutch operator to the engine, clutch, accelerator and gear-shift lever of a motor vehicle;

Fig. 12 shows in highly diagrammatic form the essential parts of the clutch of the vehicle;

Figs. 13 and 14 are views in vertical section of the mechanism whereby the gear-shift lever operates the control means of the power clutch operator, Fig. 13 being in transverse section taken along the line 13—13 of Fig. 14 and Fig. 14 being in longitudinal section.

Figure 1:
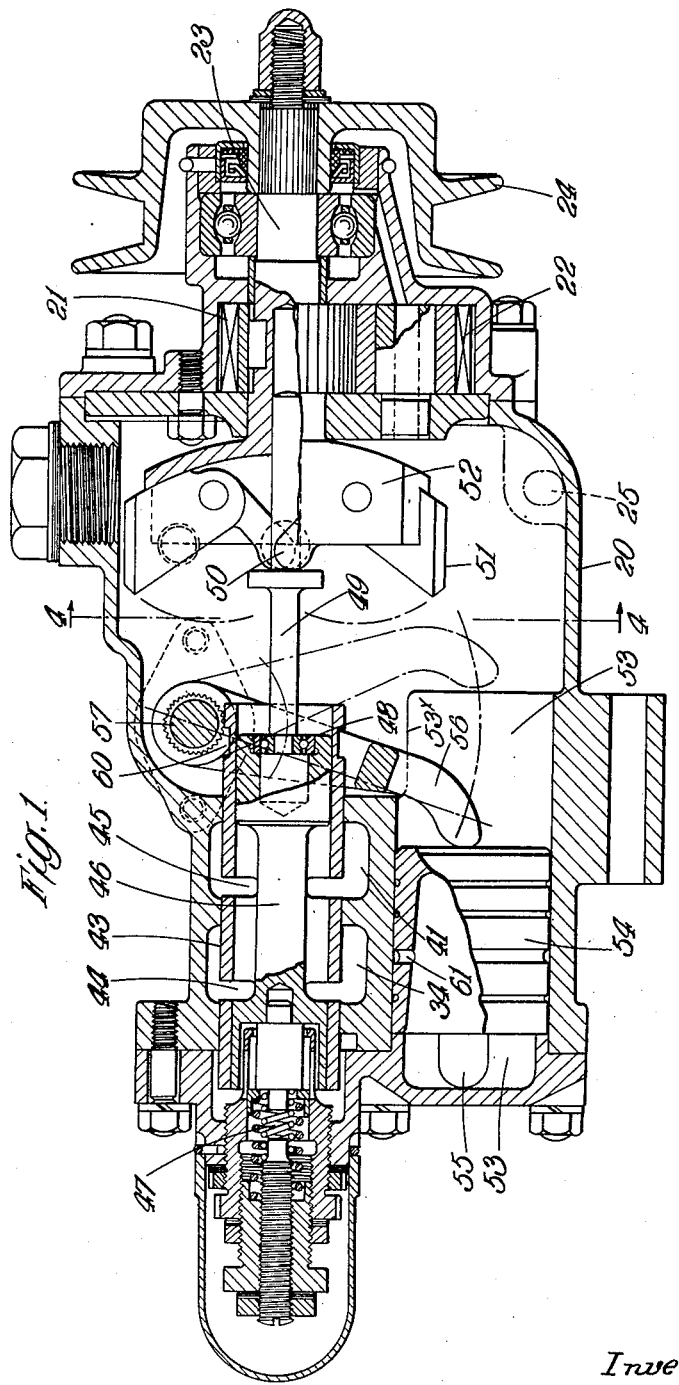
Fig. 1 is a view in central longitudinal vertical section of the power clutch operator taken along the line 1—1 of Fig. 2.
Figure 2:
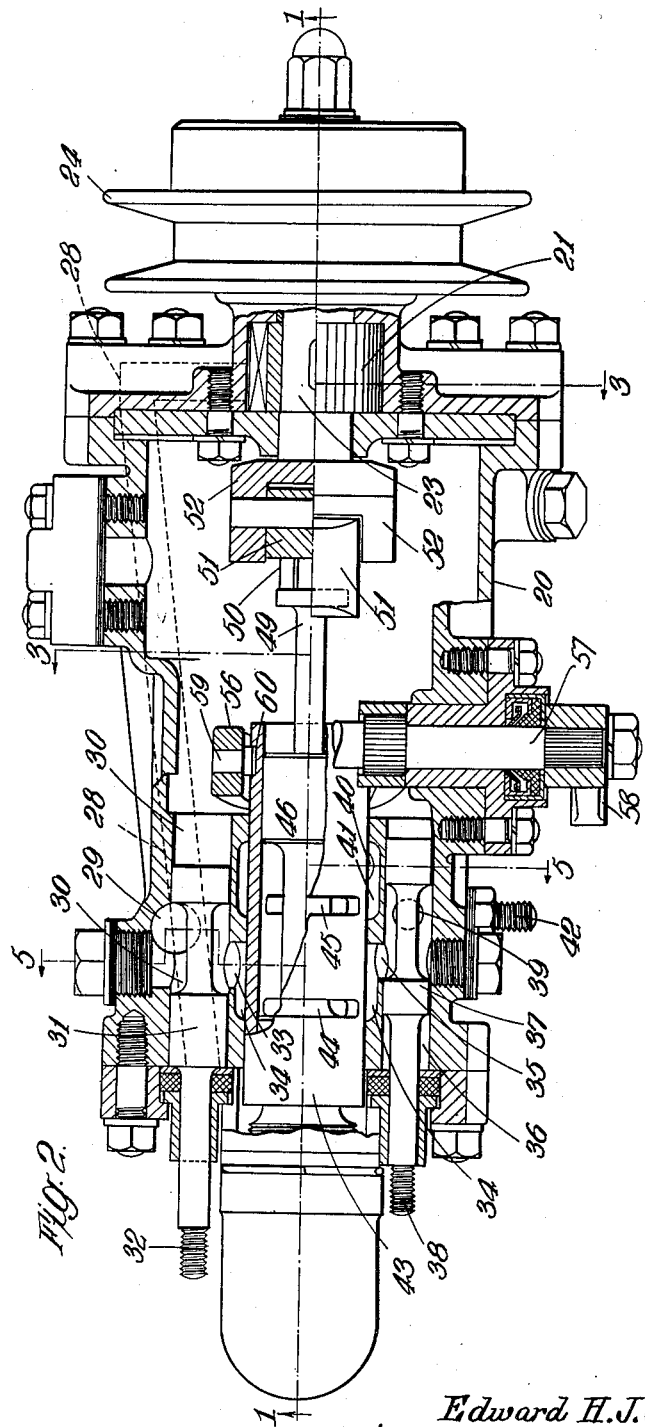
Fig. 2 is a sectional plan view of the clutch operator, the plane of the section being stepped in places to show the parts more clearly.

Referring to Figs. 1 to 5; the clutch operator comprises a casing 20 which serves as a reservoir or sump for the oil which constitutes the working fluid. For this purpose ordinary engine oil is quite suitable. Within the casing is an intermeshing gear pump 21, 22 whose driving gear 21 is mounted on a shaft 23 which carries an external belt pulley 24 which is driven from the engine crank-shaft. Pump 21, 22 draws oil from the sump through channels 25, 26, 27 and delivers it through a channel 28 to a recess 55 formed in the base of a cylinder 53 in which slides a piston 54. The head of this piston engages the end of a forked lever 56 mounted on a cross-shaft 57 which carries an external clutch-operating lever 58.

Channel 28 also communicates via a channel 29 with a valve chest 30 in which slides a valve piston 31 whose stem 32 is connected to the gear-shift lever. Valve chest 30 also contains a side port 33 leading to an annular space 34 which in turn communicates through a side port 35 with a valve chest 36 in which slides a second valve piston 37 whose stem 38 is connected to the accelerator. The valve chest 36 also communicates by means of a passage 39 with a pocket 40. The flow area of passage 39 can be adjustably constricted by means of a screw plug 42 entering the passage 39 from the side. The pocket 40 is in open communication with the sump and also in communication with a second annular space 41 coaxial with the annular space 34. These annular spaces 34, 41 surround a slidable sleeve 43 the walls of which are perforated by two sets of ports 44, 45, whereby the annular spaces 34, 41 respectively communicate with the interior of the sleeve 43. Within the sleeve 43 slides a valve piston 46 which is urged to the right (as viewed in Figs. 1 and 2) by a compound spring 47 and is connected through a thrust race 48 with a stem 49, the end of which is engaged by the feet 50 of a pair of centrifugal weights 51 pivoted in a housing 52 which is integral with the shaft 23. The centrifugal force of the weights 51 generated by the speed of rotation of their housing 52 is transmitted through the feet 50, stem 49 and thrust race 48 to the valve piston 46 tending to move the latter to the left (as viewed in Figs. 1 and 2).

In the outer surface of the sleeve 43 is formed a circular groove 60 in which engage a pair of studs 59 carried by the forked lever 56. From this connection it results that the sleeve 43 follows the movements of piston 54. It may here be stated that the force of the clutch springs acting through the lever 58 maintains the lever 56 always in contact with the head of the piston 54.

In the wall of the piston 54 is provided an orifice 61 which constitutes a leak whereby the excess oil delivered behind the piston can escape into the sump when the piston has reached the end of its stroke (to the right in Fig. 1) in which position the port 61 is clear of the wall of the cylinder 53 which is cut back at the top for this purpose, as shown in Figs. 1 and 3 at 53x.

In Fig. 1 the parts are shown in the position corresponding to high speed of the shaft 23 and full engagement of the clutch, the weights 51 being hard against their housing 52 in their outermost position and the parts 50, 49, 46 as far to the left as they will go. The piston 54 is also at the inner end of its stroke (to the left in Fig. 1) and the levers 56, 58 in the position corresponding to full clutch engagement. The sleeve 43 is therefore at the limit of its travel to the left and in this position the ports 44, 45 are uncovered by the valve piston 46. This position corresponds to the disposition of parts shown in Fig. 8.

The oil delivered through channel 28 passes through the channel 29, valve chest 30, port 31 into the annular space 34, passing thence through the ports 44 into the interior of sleeve 43 and escaping through ports 45 into the annular chamber 41 from whence it passes into the pocket 40 and thence back to the sump. There is thus an open channel from the pump delivery to the sump for the oil, which therefore circulates freely and no pressure is generated in the cylinder 53, with the result that the piston 54 remains in the position corresponding to clutch-engagement.

This condition continues as long as the shaft 23 turns at a greater speed than the upper limit of the operative speed range of the centrifugal control 46—52 but when the speed of the shaft 23 falls below this upper limit the springs 47 begin to overcome the centrifugal force of the weights 51 and consequently start to move the valve piston 46 to the right, the weights 51 swinging inwards towards the shaft.

The immediate effect of this is to close the ports 44 and the flow of oil as described above is therefore blocked and the delivery through the channel 28 is diverted into the cylinder 53 where the pressure builds up until it is sufficient to overcome the load of the clutch engaging springs and carry the piston 54 and levers 56, 58 to the right (as viewed in Fig. 1). The connection 59, 60 compels the sleeve 43 to follow the movement of the piston 54 and this movement of the sleeve 43 begins to uncover the ports 44 again, whereby the pressure is partially relieved. Further, any tendency of the piston 54 to move again to the left under the pressure exerted by the clutch engaging springs through levers 58, 56 is prevented, because the corresponding movement of the sleeve 43 would close the ports 44 and as soon as this took place the escape of oil through the ports 44 would be stopped and the pressure would build up again in the cylinder 53. It will thus be seen that the position of the valve piston 46 anywhere between its extreme limits of movement uniquely determines the position of the piston 54 independently of the viscosity, temperature etc. of the oil used or of the load imposed by the clutch engaging springs, the position of the piston 54 being such that the ports 44 are barely open.

Fig. 7 shows the position of the parts when the controlling shaft 23 is turning at some speed within the range of operation of the centrifugal control and it will be understood that the piston 54 will remain in this position as long as the speed of the shaft 23 is unaltered.

Further, it will be understood that the degree of engagement of the clutch depends solely on the position of the piston 54 and if with the latter in the position shown in Fig. 7 the clutch members are just touching but subjected to very little pressure, the clutch will slip indefinitely if the resisting torque exceeds that which the clutch will transmit without slip at such a light engagement pressure. In this case serious damage to the clutch might result.

To prevent this the accelerator-controlled valve 36, 37, 38 is provided. In the position shown in Fig. 7 the valve piston 37 is in the position corresponding to a small throttle opening. If then the accelerator is depressed so as to increase the throttle opening above a predetermined value the valve piston 37 is moved to the right and brought into the position shown in Figs. 8 and 9, thus uncovering the passage 39 and allowing the oil to escape from the annular space 34 through the valve chest 36, passage 39 and pocket 40 into the sump. This allows the oil to escape from the cylinder 53 through channel 29, valve chest 30 and port 31 and relieves the pressure behind the piston 54 enabling the clutch to engage.

A suitable limit of throttle opening beyond which the accelerator-controlled valve opens to ensure engagement of the clutch is about one-third full throttle, as for most engines and clutches this corresponds approximately to the delivery by the engine of the limiting torque that can safely be transmitted through a slipping clutch for more than a few seconds.

The limit however, can obviously be varied to suit the capacities of the particular engine and clutch in question. In order to prevent the clutch from engaging too fast when the accelerator-controlled valve opens, the passage 39 is constricted by screw plug 42, so as to compel the accumulated oil within the cylinder 53 to escape slowly and cushion the engagement of the clutch. The constriction of the passage 39 may be regulated by adjusting the screw plug 42.

Fig. 6 shows the position when the throttle is at less than its critical opening and the engine is idling at a speed equal to or less than the lower limit of the working range of the centrifugal control. In this case the valve piston 46 is at the right-hand limit of its travel and the power piston 54 and the sleeve 43 have followed the valve piston 46 (to the right) until the piston port 61 is clear of the cylinder wall at 53x Fig. 1. The excess oil delivered into cylinder 53 now escapes through the ports 61 direct into the sump and no excess pressure can be generated in the cylinder 53 to force the piston 54 any further to the right. The movement of the sleeve 43 is therefore stopped and the full movement of the valve piston 46 to the right corresponding to the lower limit of the working speed range of the centrifugal control closes the ports 44 altogether. The movements of the various parts are adjusted in the design and erection of the unit, so that, when the valve piston 46 is in its extreme position towards the right as defined by the weights 51 abutting on the head of the stem 49, the ports 44 are completely closed with the piston 54 at the limit of its stroke defined by the uncovering of the ports 61.

Fig. 9 shows the position of the parts when the throttle is open and the engine turning very slowly so that the valve piston 46 is at or near the right-hand limit of its travel and the ports 44 are completely closed. In spite of this the clutch is engaged on account of the freeing of passage 39 by the accelerator-controlled valve piston 37.

Fig. 10 shows the result of operating the gear-shift-connected valve piston 31 with the shaft 23 turning at a speed greater than the upper limit of the operative range of the centrifugal control and with the throttle opening greater than the predetermined value for engaging the clutch. The position of the parts before operating the valve 31 is as shown in Fig. 8.

It will be seen that the valve piston 46 is at the left-hand end of its travel, the weights 51 being in their most outflung position. The ports 44 are open and the passage 39 is uncovered by the accelerator-controlled valve piston 37. There are thus two paths of escape for the oil from the annular space 34, one through the interior of the sleeve 43 and ports 45 and the other through the accelerator-controlled valve 36 and passage 39. When the valve piston 31 controlled by the gear-shift lever is moved to the right as shown in Fig. 10 the port 33 is closed and oil delivered through the channel 29 and valve chest 30 is thereby prevented from entering the annular chamber 34. The whole delivery of the pump is therefore diverted into the cylinder 53 and the piston 54 is moved to the right, thus disengaging the clutch until the oil can escape through the piston port 61.

It is therefore seen that the operation of the gear-shift lever controlled valve is effective for disengaging the clutch regardless of the positions in which the centrifugally controlled valve member 46 and the accelerator-controlled valve member 37 may happen to be.

The external connections of the power clutch operator are illustrated in Fig. 11 which shows a combined engine, clutch and change-speed-gear unit for a motor vehicle, the engine being indicated at E, the clutch housing at C and the gear box at G.

The power clutch operator 20 is mounted on the engine E and its driving pulley 24 is driven by a belt 69 from a belt pulley 68 mounted on the crank-shaft 67. The external clutch-operating lever 58 is connected by means of a rod 62 with the clutch pedal lever 65. The connection of rod 62 and pedal lever 65 includes a pin and slot joint 63, 64 which enables the pedal to be operated by the foot to disengage the clutch independently of the operation of the power clutch operator. The pedal lever 65 is secured to a rock shaft 66 passing within the clutch casing C. The stem 38 of the accelerator-connected valve of the power clutch operator is connected by means of a rigid rod 70 with the accelerator pedal 71, which latter is also connected by means of a rigid rod 72 and crank 73 with the throttle barrel 74 of the carburetor 75.

The stem 32 of the independent valve 31 of the clutch operator is connected by means of a rod 76 with a crank 77 whose shaft 104 is mounted in the upper part of the gear box G immediately below the gear-shift lever 78. The shaft 104 is interconnected with the gear-shift lever 78 by the mechanism shown in Figs. 13 and 14.

Referring to Figures 13 and 14, at the top of the variable speed gear casing G is mounted the gear change lever 78 whose lower end is adapted for operating the gear selecting mechanism. The lever 78 is fulcrumed at 106 in a support 107 which is rotatable transversely and slidable longitudinally in a housing 108 forming an upward extension of the variable gear casing G.

In the support 107 is formed a circumferential V shaped groove 109 which engages the upper end of a vertically slidable pin 110 whose lower end engages a pawl 111 mounted on the cross shaft 104 which carries externally the lever 77 coupled to the rod 76. The shaft 104 also carries a pawl 112 which engages a curved tooth 114 mounted on the lower part of the lever 78. The pawl 112 is provided with a projection 113 against one side or other on which the curved tooth 114 normally lies.

The operation of this device is as follows:—

When the lever 78 is moved to effect a change of gear the first effect of this movement is to slide the support 107 longitudinally in the direction of said movement, the lever being prevented from rocking appreciably on its fulcrum 106 by the engagement of the tooth 114 with the flank of the projection 113. The movement of the support 107 by displacing the groove 109 forces the pin 110 downward against the pawl 111 thereby rocking the shaft 104 and with it the external lever 77 in an anti-clockwise direction as viewed in Figure 11, thereby moving the rod 77 and stem 32 to the right so as to operate the valve 31 (see Figure 2 etc.) in the required manner for effecting disengagement of the clutch, as already described.

The rocking of the shaft 104 raises the pawl 112 so that the tooth 114 can clear the projection 113. Continued movement of the lever 78 now rocks it about its fulcrum 106 to effect the required change of gear. When this movement has been completed and the new gear engaged the lever is released whereupon the support 107 is centralized by the means illustrated in Figure 13, consisting of a plunger 115 loaded by a spring 116.

The end of the plunger 115 is of conical form and engages the groove 109 so that it acts to urge the support 107 to a central position. The centralizing of the support 107 allows the pin 110 to rise into its normal position in which its upper point rests in the bottom of the groove 109. The raising of the pin 110 allows the elements 104, 76, 111, 112 to rock back into their normal position, the tooth 114 being again engaged with the projection 113.

The curvature of the tooth 114 is struck in an arc from the centre of the support 107 so that its engagement with the pawl 112 is not affected by sideways rocking of the gear shift lever 78. Further the projection 113 is shaped so that the tooth 114 can engage with either flank thereof according as the gear shift lever 78 is in a forward or rearward position corresponding to the particular gear selected.

By this means it will be seen that the gear shift lever 78 is not operative to shift the gears until by movement of the support 107, it has operated to disengage the clutch; further the clutch cannot be re-engaged until a gear engagement has been effected since rocking of the pawl 112 in the clutch engaging direction is blocked by the engagement of the tip of projection 113 with the tooth 114 except when the lever 78 is in one or other gear engaging position.

The connection of the stem 38 to the accelerator pedal 71 through the rigid rod 70 ensures that, when the accelerator 71 is depressed to open the throttle 74, the valve member 37 (see Fig. 2) is moved to the right and the relative lengths of the rods 70 and 72 are adjusted to ensure the engagement of the clutch when the selected throttle opening is exceeded.

The operation of the connection between the external clutch-operating lever 58 and the clutch pedal lever 65 requires no explanation. It is obvious from the drawings that when the lever 58 is rocked in a counter-clockwise direction by the application of pressure to the piston 54 of the clutch operator (see Fig. 1 etc.) the rod 62 will pull the clutch pedal lever 65 in a clockwise direction, as required for disengaging the clutch.

The internal elements of the latter are diagrammatically indicated in Fig. 12 and this figure must not be understood as showing the actual structure employed which may follow any of the forms in general use in automobile construction. In Fig. 12 the engine crank-shaft 67 carries a driving clutch member 79 which is engaged by a driven member 80 mounted on the driven shaft 81. Engagement is effected by a spring 82 working against a fixed abutment 83 and disengagement is effected by means of a striking fork 85 acting through a thrust race 84, the striking fork 85 being mounted on the cross-shaft 66 carrying the pedal lever 65, and it will be seen that disengagement is effected by a clockwise rotation of the lever 65, shaft 66 and striking fork 85.

What I claim is:—

1. In a motor vehicle, having an engine, a throttle controlling the output of the engine and a clutch; a fluid-actuated power clutch operator, a control valve therefor responsive to the engine speed, a second control valve therefor, a common controlling means for the throttle and said second named valve and an independent control valve therefor, the last named valve being operative, when suitably manipulated, to effect disengagement of the clutch at all times independently of the positions of the other two control valves, of which the second named control valve is operative to engage the clutch when the said common control means is moved sufficiently to cause the throttle opening to exceed a selected value independently of the position of the speed responsive control valve.

2. In a motor vehicle having an engine, a throttle controlling the engine output and a clutch; a power fluid-actuated clutch operator, valve control means therefor responsive to engine speed for disengaging the clutch when the engine turns at less than a selected speed, a second control valve for said clutch operator, a common controlling means for the throttle and said second named valve, said second named control valve being operative to engage the clutch when the said common control means is moved sufficiently to cause the throttle opening to exceed a selected value independently of the engine speed and an independent control valve for said clutch operator operable for disengaging the clutch at any engine speed and any throttle opening independently of the action of the other controls.

3. In a motor vehicle having an engine, a throttle controlling the engine output and a clutch; a power clutch operator, control means therefor responsive to engine speed for operating the clutch in a progressive manner over a selected range of engine speeds, the clutch being fully disengaged at speeds below the lower limit of said range and fully engaged at speeds above the upper limit of said range and the degree of clutch engagement being approximately proportional to the speed within the selected speed range, a second control means for said clutch operator, a common controlling means for the throttle and said second named means, said second named control means being operative to engage the clutch when the said common control means is moved sufficiently to cause the throttle opening to exceed a selected value independently of the engine speed and independent control means for said clutch operator operable for disengaging the clutch at any engine speed and any throttle opening independently of the action of the other two controls.

4. In a motor vehicle having an engine, a throttle controlling the engine output and a clutch engageable by spring means; a clutch disengaging member, a fluid-actuated power clutch operator actuating said disengaging member, valve control means therefor responsive to the engine speed for disengaging the clutch at speeds below a selected speed, a second control valve, a common controlling means for the throttle and said second named valve, said second named valve being operative to disable the speed responsive control valve thereby to prevent disengagement of the clutch when the said common control means is moved sufficiently to cause the throttle opening to exceed a selected value and an independent control valve for the power clutch operator operable at will to bring about disengagement of the clutch at any engine speed and at any throttle opening independently of the action of the other controls.

5. In a motor vehicle having an engine, a throttle controlling the engine output and a clutch; a fluid-actuated power clutch operator, engine speed responsive control means therefor movable to clutch engaging position when the engine turns at more than a selected speed, a control means for said power clutch operator including an independent valve, a common controlling means for the throttle and said control means, said control means being operative to engage the clutch when the said common control means is moved sufficiently to cause the throttle opening to exceed a selected value, the movement of either of said control means to clutch-engaging position bringing about engagement of the clutch, disengagement of which is brought about by movement of both said control means to clutch disengaging position and another independent control valve for said power clutch operator, movement of said last named control valve to clutch disengaging position bringing about clutch disengagement when either of the first named control means is in clutch engaging position.

6. In a motor vehicle having an engine, a throttle controlling the engine output and a clutch engageable by spring means; a power clutch operator including a source of fluid pressure, a clutch disengaging member, a pressure channel from said source to said clutch disengaging member, two parallel relief channels branching from said pressure channel, valve means controlling said relief channels, and engine speed responsive means, said valve means comprising three valves of which one is operated by the engine speed responsive means and controls one of said relief channels, a common controlling means for the throttle and the second of said valves to control the other of said relief channels and the third is independently operated and controls both said relief channels, being in series with both of the other two valves.

7. In a motor vehicle having an engine, a throttle controlling the engine output, a clutch engageable by spring means, a change-speed-gear and a gear-shift lever; a power clutch operator including a source of fluid pressure, a clutch disengaging member, a pressure channel from said source to said clutch disengaging member, two parallel relief channels branching from said pressure channel, valve means controlling said relief channels and engine speed responsive means, said valve means comprising three valves of which one is operated by the engine speed responsive means and controls one of said relief channels, a common controlling means for the throttle and the second of said valves to control the other of said relief channels and the third is operated by the gear-shift lever and controls both said relief channels, being in series with both of the other two valves.

8. In a motor vehicle having an engine, a throttle controlling the engine output and a clutch; a power clutch operator including a power source, a clutch operating motor, a circuit for the power medium and connecting said source with said motor, two shunt circuits and three shunt-circuit interrupting devices and engine speed responsive means for controlling one of said interrupting devices, common control means for the throttle and a second of said interrupting devices, the other interrupting device being independently controlled, the second of said interrupting devices being operative to effect engagement of the clutch when the common control means is moved sufficiently to cause the throttle opening to exceed a selected value independently of the position of the interrupting device controlled by the speed responsive means and the independently controlled interrupting device operating to effect disengagement of the clutch independently of the position of either of the other two interrupting devices.

9. In a motor vehicle having an engine, a throttle controlling the engine output and a clutch; a power clutch operator including a source of fluid pressure, a clutch operating motor, a pressure channel connecting said source with said motor, two bypass relief channels branching from the pressure channel, three relief valves and engine speed responsive means for controlling one of said valves, one of the other two valves being independently controlled, common controlling means for the throttle and the third valve, said third valve operating to effect engagement of the clutch when said common controlling means is moved to cause the throttle opening to exceed a selected value independently of the position of the valve controlled by the speed responsive means and the independently controlled valve operating to effect disengagement of the clutch independently of the position of either of the other two valves.

10. In a motor vehicle having an engine, a throttle controlling the engine output and a clutch engageable by spring means; a power clutch operator including a source of fluid pressure, a clutch disengaging member, a pressure channel from said source to said clutch disengaging member, two parallel relief channels branching from said pressure channel, valve means controlling said relief channels and engine speed responsive means, said valve means comprising three valves, of which one controls one of said relief channels and comprises two movable valve members operated respectively by the engine speed responsive means and by the clutch disengaging member and coacting to regulate the position of the clutch disengaging member in accordance with the engine speed over a selected speed range, so that the clutch is progressively disengaged as the speed decreases through said range and vice versa; a common controlling means for the throttle and the second of said valves, said second valve controlling the other of said relief channels and the third of said valves being independently operated and controlling both of said relief channels, said third valve being in series with both of the other two valves.

11. In a motor vehicle, having an engine, a throttle controlling the output of the engine, a clutch, change-speed gearing and a gear-shift lever; a power clutch operator, control means therefor responsive to the engine speed, for operating the clutch in a progressive manner over a selected range of engine speeds, the clutch being fully disengaged at speeds below the lower limit of said range and fully engaged at speeds above the upper limit of said range and the degree of clutch engagement being approximately proportional to the speed within the selected speed range, second control means for said clutch operator, common controlling means for the throttle and said second control means, further control means connected with the gear-shift lever and operative to effect disengagement of the clutch during changes of gear at all times, independently of the positions of the other two control means, of which the said second control means is operative to engage the clutch when said common controlling means is moved sufficiently to cause the throttle opening to exceed a selected value independently of the position of the speed responsive control means.

EDWARD HENRY JAMES CECIL GILLETT.